June 2, 1936.  J. C. CURTIS  2,042,926
TOOL RETAINER
Filed Feb. 26, 1934  2 Sheets-Sheet 1
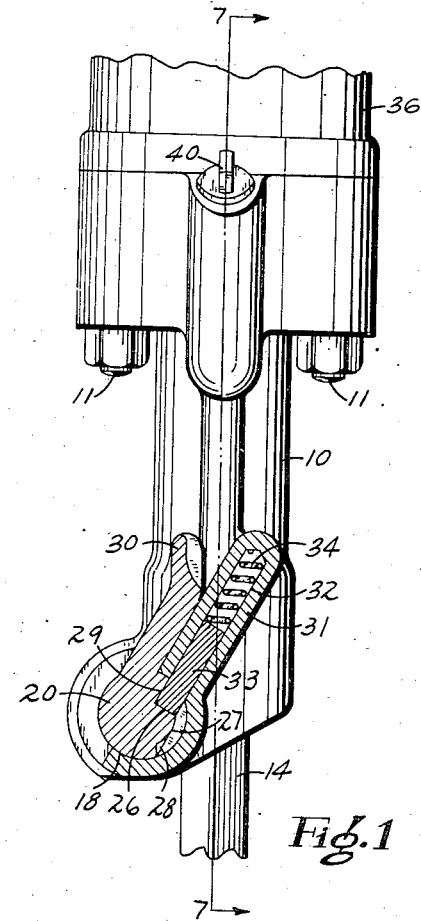
Fig.1
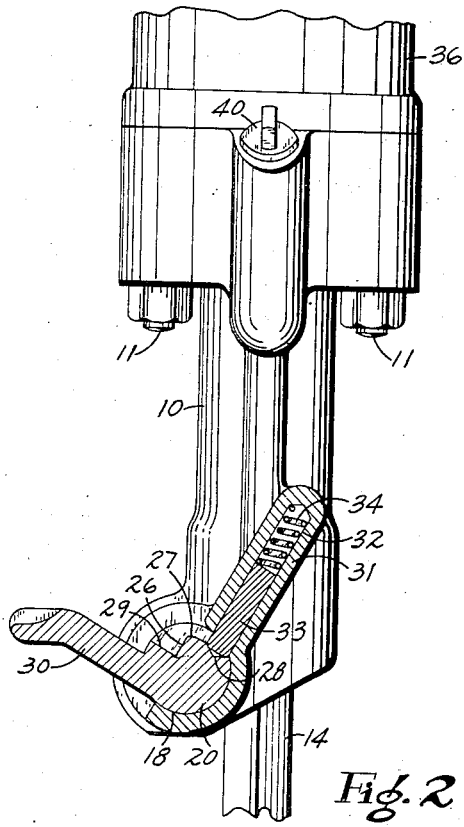
Fig.2
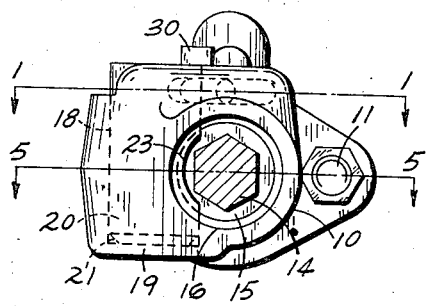
Fig.3
Fig.4
JOHN C. CURTIS
INVENTOR
BY *John E. Renfer*
ATTORNEY June 2, 1936.  J. C. CURTIS  2,042,926
TOOL RETAINER
Filed Feb. 26, 1934  2 Sheets-Sheet 2

JOHN C. CURTIS
INVENTOR

BY John E. Renfer
ATTORNEY

Patented June 2, 1936

2,042,926

UNITED STATES PATENT OFFICE 2,042,926

TOOL RETAINER

John C. Curtis, Garfield Heights, Ohio, assignor to The Cleveland Rock Drill Company, Cleveland, Ohio, a corporation of Ohio Application February 26, 1934, Serial No. 713,011

11 Claims. (Cl. 121—32)

This invention relates broadly to rock drills, but more particularly to tool retainer for rock drills of the hammer type.

One object of this invention is to produce an improved retainer which is simple in design, economical of manufacture, and susceptible of ready manipulation.

Another object of this invention is to provide a tool retainer wherein the working parts are protected from the dust or foreign matter resulting from the drilling operation.

Another object of this invention is to provide a tool retainer equipped with a lubricating device whereby lubricant is constantly admitted to the movable parts of the retainer.

These objects are accomplished by a construction free of complication, and by an arrangement of parts resulting in a compact unit which is strong, durable, and efficient.

In the drawings which illustrate a preferred embodiment of the invention.

Fig. 1 is a cross sectional view taken in a plane indicated by line 1—1 in Fig. 3, illustrating the front portion of a rock drill with the tool retainer shown in operative position.

Fig. 2 is a view similar to Fig. 1, illustrating the retainer in inoperative position.

Fig. 3 is an end view of the portion of the machine shown in Fig. 1.

Fig. 4 is a longitudinal view of the tool retainer.

Figure 5:
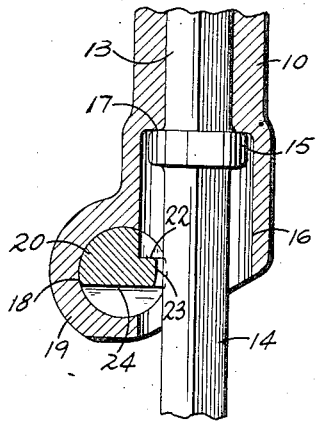
Fig. 5 is a cross sectional view taken in a plane indicated by line 5—5 in Fig. 3, illustrating the tool retainer in operative position.

Referring to the drawings in which like symbols designate corresponding parts throughout the several views, 10 represents the front housing of a rock drill, which may be secured thereto by bolts 11. The housing 10 is formed with a longitudinally disposed bore 12 adapted to slidably receive the corresponding shank 13 of a cutting tool 14, which is formed with a collar 15 integral thereon. Toward the front, the bore 12 is enlarged in a counterbore 16 of a diameter somewhat greater than that of the collar 15, permitting thereby the slidable movement of the latter within the former. The bottom of the counterbore 16 constitutes a shoulder 17 against which the collar 15 is capable of abutting engagement for limiting the penetration of the shank 13 into the bore 12.

Toward the front end, the housing 10 is provided with a transversely disposed cylindrical chamber 18 opening part way into the counterbore 16 in inter-secting relation with the tool 14. This chamber has one end closed as at 19, while the other end thereof is open to permit the introduction of a cylindrical retainer plug 20, formed with a beveled end 21. The plug 20 is rotatable within the chamber 18, and is formed, at a place calculated to line up with the center axis of the housing 10, with a land or stop 22 capable of engagement with the collar 15 of the tool 14. The circumferential wall of the plug 20 leading from the central portion of the marginal edge of the stop 22, is milled to form a semi-circular recess 23 permitting the free longitudinal movement of the tool 14. Disposed at right angle with the recess 23, the plug 20 is formed with an enlarged semi-circular recess 24, of a radius equal to that of the counterbore 16. Since the chamber 18 is intersecting the tool 14, it will be noticed that the recess 23 is necessary to permit the free slidable movement of the tool, while the recess 24 is necessary to permit the free passage of the collar 15. The portion of the plug 20 located at each end of these recesses is constantly overlapping the tool 14, increasing thereby the engaging surface of the stop 22 with the collar 15, and preventing the removal of the plug 20 from its chamber while the tool 14 is within the housing 10.

Located in spaced relation with the left end of the plug 20 and the corresponding end of the recess 24, there is provided a partly circumferentially disposed slot 25, the bottom thereof constituting a duality of flats 26 and 27 disposed at right angle from each other. The flat 27 extends to the periphery of the plug, and toward that end is provided with a recess 28, while the flat 26 is connected to the periphery of the plug by a relatively long wall or stop 29.

Extending at right angle from the outer end portion of the plug 20, there is a handle 30 capable of engagement with a rib 31 formed on the side of the housing 10, and provided with a bore 32 opening into the chamber 18 at a point in advance of its center axis. Slidably mounted within the bore 32, there is a plunger 33 having one end portion thereof protruding into the slot 25, the former being maintained in engagement with the bottom of the latter by the action of a compression spring 34, which is interposed between the bottom of the bore 32 and the inner end of the plunger 33.

The upper portion of the bore 12 is machined to form an enlarged counterbore 35 adapted to receive in press fit engagement therewith, the front end of the rock drill cylinder 36, having secured therein a bushing 37 within which the piston 38 is reciprocably mounted. Formed within the housing 10, there is a lubricant reservoir 39 which may be filled by removing a screw threaded plug 40. Leading from the reservoir 38, there are two restricted ports 41 and 42, the former opening into an enlarged passage 43 for admitting lubricant into the bore 32, while the port 41 opens into the interior of the bushing 36.

In the operative position shown in Figs. 1 and 5, the plug or retainer 20 is located with the stop or land 22 normal to the center axis of the tool 14, thus permitting the engagement of the former with the collar of the latter to prevent the accidental removal of the tool from its housing. The rotation of the retainer plug 20 in the clockwise direction is prevented by the engagement of the plunger 33 with the wall or stop 29 formed within the slot 25, and by the engagement of the handle 30 with the rib 31. During the operative position of the retainer plug 20, the end of the plunger 33 is maintained in forcible engagement with the flat 26 formed within the slot 25. Since this plunger is located in advance of the center axis of the retainer plug, it will prevent the accidental rotation of the latter in a counter clockwise direction.

Figure 6:
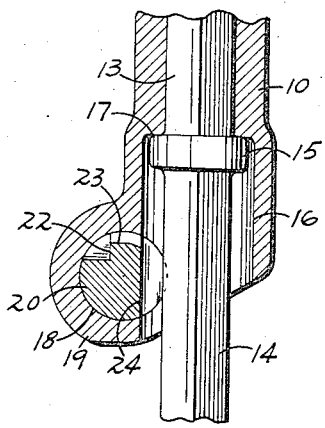
Fig. 6 is a view similar to Fig. 5 illustrating the retainer in inoperative position.
Figure 7:
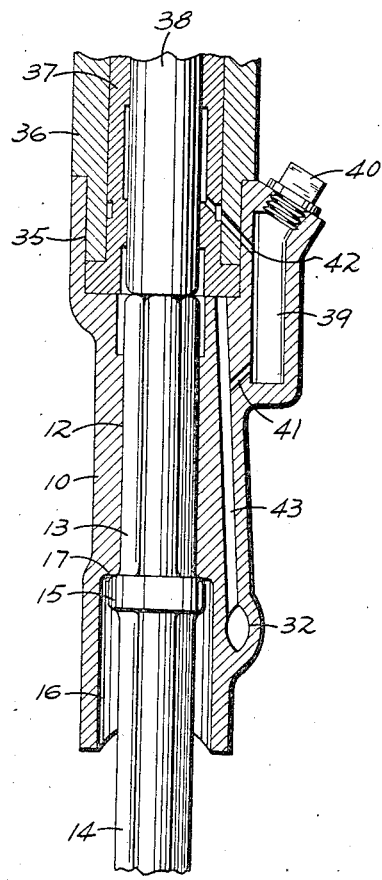
Fig. 7 is a longitudinal cross sectional view taken in a plane indicated by line 7—7 in Fig. 1.

When it is desired to rotate the plug in its inoperative position, sufficient pressure must be applied on the handle 32 for permitting the junction point of the flat 26 with the flat 27 to cause the inner movement of the plunger 33 against the compression spring 34. When the end of the plunger finally drops into the recess 28, the retainer plug is located in its inoperative position as shown in Figs. 2 and 6, with the enlarged recess 24 positioned in parallel alignment with the central axis of the tool. Since this recess is of a diameter greater than that of the tool collar 15, the tool is free to drop from its housing. The engagement of the outer end portion of the plunger 33 within the recess 28, is sufficient to lock the retainer plug 20 in its inoperative position. A slight pressure properly applied on the handle 30 will suffice to cause the rotation of the retainer plug 20 in its operative position.

It will be noted that the retainer plug 20 is locked against lateral movement by the engagement of the plunger 33 with the side walls of the slot 25, constituting thereby a simple and efficient method of securing the retainer plug 20 within the chamber 18. When it is desired to remove the plug 20, the latter may be rotated in a counter clockwise direction until the end portion of the plunger 33 has left the slot 24 and is engaging the circumferential wall of the plug. Thereafter, the plug may be pulled out of the chamber 18 without any interference. When the plug 20 is again inserted into the chamber 18, the beveled end 21 will engage the outer end of the plunger 33, thus causing the movement of the latter against the compression spring 34, permitting thereby the slidable movement of the plug until it reaches the end wall 19. Thereafter, the plug 20 may be rotated to cause the engagement of the plunger 33 within the slot 24.

During the operation of the rock drill, a restricted portion of the pressure fluid admitted into the cylinder to cause the reciprocation of the piston 38, will escape between the piston and the interior of the bushing 37 and be admitted into the lubricant reservoir 39 through the restricted port 42. From the lubricant reservoir, the pressure fluid laden with lubricant will flow via the restricted port 41 and passage 43 into the bore 32 in arriere of the plunger 33, thus cooperating with the spring 34 for causing the forcible engagement of the plunger with the bottom of the slot 24. Some of the pressure fluid ladened with lubricant admitted into the bore 32 will escape therefrom between the inner wall of the latter and the plunger 33, thus causing an efficient lubricating device for the plunger 33 and plug 20, since the lubricant is in this manner admitted on the periphery of the latter.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a tool retainer for rock drills, the combination of a housing, a collared tool slidable therein, a member within said housing normally rotatable into or out of engageable position with the collar of said tool, a slot within said member, and spring actuated means engageable with one wall of said slot for locking said member into or out of said engageable position and with another wall of said slot for preventing the removal of said member from said housing when said member is located into or out of said position and during its normal rotation.

2. In a tool retainer for rock drills, the combination of a housing, a collared tool slidable therein, a member within said housing normally rotatable on its own axis into or out of engageable position with the collar of said tool, and unitary means within said housing interacting with means formed within said member for locking the latter into or out of said engageable position and preventing its removal from said housing when said member is located into or out of said position and during its normal rotation.

3. In a tool retainer for rock drills, the combination of a housing, a collared tool slidable therein, a member transversely disposed within said housing rotatable on its own axis into or out of engageable position with the collar of said tool, a slot within said member, and a spring actuated element engageable with the bottom of said slot for locking said member into or out of said engageable position, said element being engageable with the side walls of said slot for preventing the removal of said member from said housing.

4. In a tool retainer for rock drills, the combination of a housing, a collared tool slidable therein, a member within said housing rotatable on its own axis into or out of engageable position with the collar of said tool, a slot within said member, and means including a spring pressed plunger interacting with one wall of said slot for limiting the rotary movement of said member in one direction and with another wall of said slot for preventing the removal of said member from said housing.

5. In a tool retainer for rock drills, the combination of a housing, a collared tool slidable therein, a member within said housing rotatable into or out of engageable position with the collar of said tool, a spring pressed plunger slidable within said housing engaging said member in advance of the center axis thereof for locking the latter into or out of said engageable position, and means within said member inter-acting with said plunger for preventing the removal of the former from said housing.

6. In a tool retainer for rock drills, the combination of a housing, a collared tool slidable therein, a closed end chamber transversely within said housing, a member within said chamber normally rotatable into or out of engageable position with the collar of said tool, unitary means within said housing interacting with means formed within said member for maintaining the latter into or out of said engageable position and preventing the removal thereof from said chamber during its normal rotation, and an actuating handle secured to said member engageable with said housing for limiting the rotary motion of said member in one direction.

7. In a tool retainer for rock drills, the combination of a housing, a collared tool slidable therein, a cylindrical member rotatable within said housing, and a land within the periphery of said member rotatable into or out of engageable position with the collar of said tool.

8. In a tool retainer for rock drills, the combination of a cylindrical housing having a bore therein, a collared tool slidable within said bore, a transverse chamber opening into said bore in intersecting relation with said tool, a member rotatable within said chamber, a cut-away portion intermediate the end of said member permitting the free slidable movement of said tool, and a stop like portion within the periphery of said member rotatable into or out of engageable position with the collar of said tool due to the intersecting relation of said chamber with the latter.

9. In a tool retainer for rock drills, the combination of a housing, a collared tool slidable therein, a bore within said housing at right angles with the center axis of said tool, a cylindrical member rotatable within said bore, a land within the periphery of said member rotatable into or out of engageable position with the collar of said tool, the inner wall of said bore on both sides of said land surrounding said member in radial thrust bearing relation therewith.

10. In a tool retainer for rock drills, the combination of a housing, a collared tool slidable therein, a bore within said housing at right angles with the center axis of said tool, a cylindrical member rotatable within said bore, a land within the periphery of said member, said bore arranged and disposed in relation to said tool in a manner affording said land to be moved into or out of engageable position with the collar of said tool upon rotation of said member, and means associated with said housing and member limiting the rotation of the latter in one direction where said land is positioned for engagement with the collar of said tool.

11. In a tool retainer for rock drills, the combination of a housing, a tool having a collar integral therewith slidable within said housing, a tool retaining member rotatable within said housing and located within the path of the collar of said tool for engagement therewith to prevent the removal of said tool from said housing, and a recess within said member rotatable in a position affording the free passage of the collar of said tool to permit the removal of said tool from said housing.

JOHN C. CURTIS.